US012786599B2

(12) United States Patent
Weiershausen et al.

(10) Patent No.: US 12,786,599 B2
(45) Date of Patent: Nov. 3, 2026

(54) ESTABLISHING OR SWITCHING AN OPTICAL TRANSMISSION PATH IN ORDER TO TRANSMIT AN OPTICAL SIGNAL

(71) Applicant: Deutsche Telekom AG, Bonn (DE)

(72) Inventors: Werner Weiershausen, Eppertshausen (DE); Thomas Haag, Rodgau (DE)

(73) Assignee: DEUTSCHE TELEKOM AG, Bonn (DE)

( * ) Notice: Subject to any disclaimer, the term of this patent is extended or adjusted under 35 U.S.C. 154(b) by 252 days.

(21) Appl. No.: 18/704,975

(22) PCT Filed: Oct. 31, 2022

(86) PCT No.: PCT/EP2022/080348
§ 371 (c)(1),
(2) Date: Apr. 26, 2024

(87) PCT Pub. No.: WO2023/078830
PCT Pub. Date: May 11, 2023

(65) Prior Publication Data
US 2025/0008246 A1 Jan. 2, 2025

(30) Foreign Application Priority Data
Nov. 3, 2021 (EP) .................................... 21206268

(51) Int. Cl.
*H04Q 11/00* (2006.01)
*H04J 14/02* (2006.01)

(52) U.S. Cl.
CPC ...... *H04Q 11/0005* (2013.01); *H04J 14/0269* (2013.01)

(58) Field of Classification Search
CPC .......... H04Q 11/0005; H04Q 2011/005; H04L 45/34; H04L 45/62; H04J 14/0264; H04J 14/0269; H04J 14/0276
See application file for complete search history.

(56) References Cited

U.S. PATENT DOCUMENTS 5,175,777 A * 12/1992 Bottle ................ H04Q 11/0005 398/55
5,488,501 A * 1/1996 Barnsley ............. H04J 14/0246 398/102
(Continued)

FOREIGN PATENT DOCUMENTS

EP 0494831 A2 * 7/1992 ........... H04B 10/572
EP 0223258 B1 * 1/1994 ......... H04Q 11/0005
(Continued)

OTHER PUBLICATIONS

Lin IEEE Photonics Technology Letters (Year: 2000).*
(Continued)

*Primary Examiner* — David C Payne
*Assistant Examiner* — Mohammed Abdelraheem
(74) *Attorney, Agent, or Firm* — LEYDIG, VOIT & MAYER, LTD.

(57) ABSTRACT

A method for establishing or switching an optical transmission path in order to transmit an optical signal includes the following steps: in a first step, segment optical switching identifier information is detected and determined by a segment destination optical node; and in a second step, the segment destination optical node is controlled such that—depending on determined content of the segment optical switching identifier information—either a first output port or a second output port is selected regarding establishing or switching the optical transmission path.

13 Claims, 1 Drawing Sheet

(56) References Cited

U.S. PATENT DOCUMENTS

| | | | | |
|---|---|---|---|---|
| 5,504,607 | A * | 4/1996 | Smith | G02B 6/2826 398/79 |
| 5,617,233 | A * | 4/1997 | Boncek | H04Q 11/0003 398/154 |
| 2002/0027686 | A1 * | 3/2002 | Wada | H04Q 11/0005 398/87 |
| 2002/0109879 | A1 * | 8/2002 | Wing So | H04Q 11/0005 398/58 |
| 2017/0311056 | A1 * | 10/2017 | Mehrvar | H04Q 11/0066 |

FOREIGN PATENT DOCUMENTS

| | | | | |
|---|---|---|---|---|
| EP | 1499077 B1 * | 3/2012 | | H04Q 11/0005 |
| FR | 2709839 A1 * | 3/1995 | | H04Q 11/0005 |
| WO | WO-2017181855 A1 * | 10/2017 | | H04Q 11/0066 |

OTHER PUBLICATIONS

Blumenthal Journal of Lightwave Technology (Year: 2000).*
Duro José et al, "Segment Switching: A New Switching Strategy for Optical HPC Networks", IEEE Access, IEEE, USA, vol. {0} 9, Feb. 9, 2021 (Feb. 9, 2021), p. 43095-43106, XP011844643.

* cited by examiner

ESTABLISHING OR SWITCHING AN OPTICAL TRANSMISSION PATH IN ORDER TO TRANSMIT AN OPTICAL SIGNAL

CROSS-REFERENCE TO PRIOR APPLICATIONS

This application is a U.S. National Phase application under 35 U.S.C. § 371 of International Application No. PCT/EP2022/080348, filed on Oct. 31, 2022, and claims benefit to European Patent Application No. EP 21206268.1, filed on Nov. 3, 2021. The International Application was published in English on May 11, 2023 as WO 2023/078830 A1 under PCT Article 21(2).

FIELD

The present invention relates to a method for establishing or switching an optical transmission path in order to transmit an optical signal, wherein a telecommunications network comprises a plurality of optical network nodes and wherein the optical transmission path traverses at least two consecutive optical network nodes of a transmission segment, the at least two consecutive optical network nodes comprising at least a segment source optical node and at least a segment destination optical node.

Furthermore, the present invention relates to an optical network node for establishing or switching an optical transmission path in order to transmit an optical signal, the optical network nodes being part of a telecommunications network comprising a plurality of optical network nodes and corresponding, along the transmission path of the optical signal, to a segment destination optical node receiving the optical signal from a segment source optical node.

Additionally, the present invention relates to a backbone network, aggregation network or telecommunications network for establishing or switching an optical transmission path in order to transmit an optical signal, the backbone network, aggregation network or telecommunications network comprising a plurality of optical network nodes.

Additionally, the present invention relates to a system for establishing or switching an optical transmission path in order to transmit an optical signal comprising a plurality of optical network nodes.

Furthermore, the present invention relates to a program and to a computer-readable medium for operating an optical network node.

BACKGROUND

The exchange of information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

In conventionally known or current telecommunications networks, often optical data transmission, or data transport, is used. Typically in such networks, a certain number of optical network nodes are connected to each other such as to be able to provide, potentially, different transmission paths or routes—between two considered points or network nodes—through the telecommunications network (or through a part of the telecommunications network, such as, e.g., a backbone network and/or an aggregation network). Typically in such known telecommunications networks, optical switching elements are used that typically provide one or a plurality of input ports and at least two (but, typically, more than two) output ports, and wherein such optical switching elements are controlled or are able to be configured such as to be able to forward (i.e. to switch) an optical input signal (being received at the input port or at one (i.e. a specific one) of the input ports) either to one or to another (i.e. a specific one) of the output ports. Via different such optical switching elements and a corresponding configuration of these optical switching elements, a path (or a route) of an optical signal (that is to be transported or transmitted by the telecommunications network) is able to be defined or switched.

However, typically, the configuration of or controlling the different optical switching elements is performed via using a control plane or a plurality of control connections, typically carrying electrical control signals, via which the configuration of each of the optical switching elements is able to be defined. This typically involves and requires—in conventionally known telecommunications networks and in addition to the optical infrastructure for user plane data transport—a centrally controlled or centrally coordinated control infrastructure as part of the telecommunications network, via which the required configuration of each one of the optical switching elements is conducted.

SUMMARY

In an exemplary embodiment, the present invention provides a method for establishing or switching an optical transmission path in order to transmit an optical signal. A telecommunications network comprises a plurality of optical network nodes. The optical transmission path traverses at least two consecutive optical network nodes of a transmission segment. The at least two consecutive optical network nodes include at least a segment source optical node and at least a segment destination optical node. Regarding the establishment or switching of the optical transmission path, segment optical switching identifier information is transmitted by the segment source optical node and received by the segment destination optical node. The segment optical switching identifier information is transmitted together with the optical signal. The segment destination optical node comprises a probe optical branch and at least a first output port and at least a second output port. The method includes the following steps: in a first step, the segment optical switching identifier information is detected and determined by the segment destination optical node; and in a second step, the segment destination optical node is controlled such that—depending on determined content of the segment optical switching identifier information—either the first output port or the second output port is selected regarding establishing or switching the optical transmission path.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
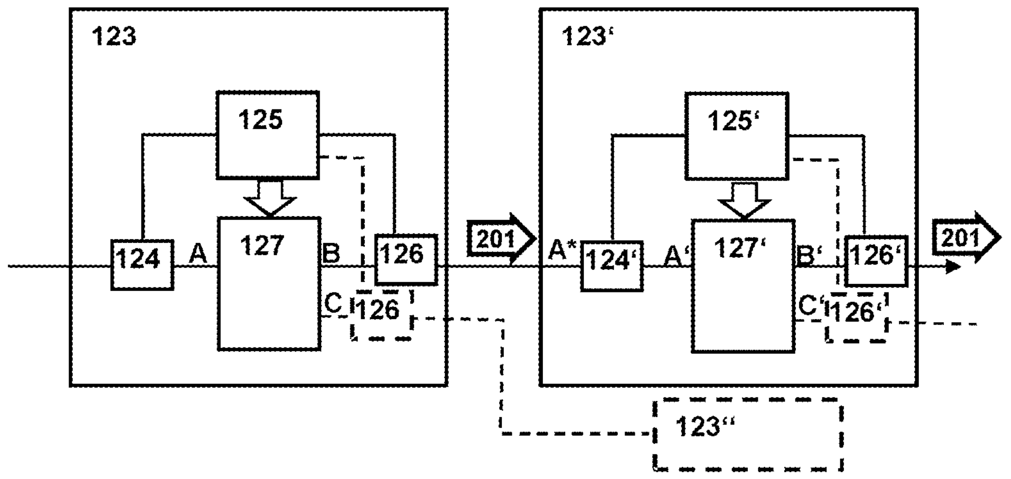
FIG. 1 schematically shows a plurality of optical network nodes or optical nodes each having a probe optical branch.

Exemplary embodiments of the present invention provide a technically simple, effective and cost effective solution for establishing or switching an optical transmission path in order to transmit an optical signal, wherein a telecommunications network comprises a plurality of optical network nodes and wherein the optical transmission path traverses at least two consecutive optical network nodes of a transmission segment, wherein, regarding the establishment or switching of the optical transmission path, a segment optical switching identifier information is transmitted by the segment source optical node and received by the segment destination optical node, wherein the segment optical switching identifier information is transmitted together with the optical signal. Further exemplary embodiments of the present invention provide a corresponding optical network node, a corresponding backbone network, aggregation network and/or telecommunications network, and a corresponding system.

Exemplary embodiments of the present invention provide a method for establishing or switching an optical transmission path in order to transmit an optical signal, wherein a telecommunications network comprises a plurality of optical network nodes and wherein the optical transmission path traverses at least two consecutive optical network nodes of a transmission segment, the at least two consecutive optical network nodes comprising at least a segment source optical node and at least a segment destination optical node,

- wherein, regarding the establishment or switching of the optical transmission path, a segment optical switching identifier information is transmitted by the segment source optical node and received by the segment destination optical node, wherein the segment optical switching identifier information is transmitted together with the optical signal,
- wherein the segment destination optical node comprises a probe optical branch and at least a first output port and at least a second output port.
- wherein, in order to establish or to switch the optical transmission path through the optical network nodes of the telecommunications network, the method comprises the following steps:
  - in a first step, the segment optical switching identifier information is detected and determined by the segment destination optical node and
  - in a second step, the segment destination optical node is controlled such that—depending on the determined content of the segment optical switching identifier information—either the first output port or the second output port is selected regarding establishing or switching the optical transmission path.

It is thereby advantageously possible according to the present invention to provide for a transmission of the segment optical switching identifier information together with the (user plane) optical signal, i.e. in a physically linked manner. Especially, it is thereby advantageously possible that the user plane optical signal and the control signal (i.e. the segment optical switching identifier information) are almost necessarily transmitted and/or transported together or as a bundle. Thereby, it is physically almost impossible that both these signals are transported or transmitted using a different optical path (or route) through the optical network. There are different possibilities how an actually implemented (or configured) transmission path (or optical route), through the optical network, is defined and/or communicated among different optical network nodes (i.e. subsequent optical network nodes along the optical path). However, according to the present invention, it is advantageously possible that a transmission path between two optical network nodes (hereinafter also called global source optical node and global destination optical node) is defined via self-switching (or also called self-routing) through the network. Thereby, 'switching itself or source-switching' or 'self-steering' means that the path (or route) is started at one (i.e. the global source optical node) of the two optical nodes, via different optical segments of the path towards the global destination optical node. Hence, the global source optical node might define the whole path through the network.

This is realized, according to the present invention, via, among each pair of consecutive optical network nodes (also called an optical transmission (or transport) segment along the transmission path of the optical signal, comprising a segment source optical node (as the optical node where the optical signal arrives first) and a segment destination optical node (as the optical node where the optical signal arrives second)), the segment destination optical node comprises a probe optical branch via which the segment optical switching identifier information is able to be detected and/or determined such as to be able to choose either a first output port or at least a second output port (of the segment destination optical node). Hence, regarding the establishment or switching of the optical transmission path, the segment optical switching identifier information is transmitted by the segment source optical node and received by the segment destination optical node, the segment optical switching identifier information being transmitted together with the optical signal, and, in order to establish or to switch the optical transmission path through the optical network nodes of the telecommunications network, in a first step, the segment optical switching identifier information is detected and/or determined by the segment destination optical node and, in a second step, the segment destination optical node is controlled such that-depending on the determined content of the segment optical switching identifier information-either the first output port or the second output port is selected regarding establishing or switching the optical transmission path. Of course, according to the present invention, a typical optical network node comprises more than two output ports, typically at least three, four, or five, or more, potentially up to 10 or 15 output ports. Likewise, a typical optical network node might comprise a plurality of input ports, such as two, or three, or four, or five, or more, potentially up to 10 or 15 input ports.

The telecommunications network according to the present invention might be a fixed-line telecommunications network or a mobile communication network but could also have both aspects, i.e. parts of a fixed-line telecommunications network (or being a fixed-line telecommunications network in such parts) and parts of a mobile communication network (or being a mobile communication network in such parts); such networks are also known under the term fixed-mobile-convergence networks (FMC networks).

Furthermore, it is advantageously possible and preferred according to the present invention that a spectral transmission width is associated or assigned to the (user plane)

optical signal and wherein the segment optical switching identifier information is transmitted together with the optical signal either as a modulation of the optical signal and thereby using its associated or assigned spectral transmission width, or as an optical sideband (signal), spectrally neighboring the optical signal, wherein the optical sideband uses a spectral fraction of the overall spectral transmission width of or associated or assigned to the optical signal.

Thereby, it is advantageously possible to physically link the optical signal, i.e. the user plane optical signal, with the control signal, i.e. the signal carrying or transporting the segment optical switching identifier information. The spectral transmission width is able to be understood as the spectral width of an optical transmission window to be potentially used by the user plane optical signal. In case that the segment optical switching identifier information is transmitted (i.e. the control signal carrying the segment optical switching identifier information) as a modulation of the user plane optical signal, both signals are combined via modulation (either an amplitude modulation or a phase modulation or a combination of both). However, via the commonly used or assigned or associated spectral transmission width, even if the control signal transmitting (or carrying) the segment optical switching identifier information is not (entirely) modulated onto the optical signal (and spectrally separated from the optical signal), the control signal is nevertheless physically linked to the optical signal via the shared spectral transmission width, i.e. the (optical) control signal neighbors the (user plane) optical signal such that an optical sideband, especially spectrally neighboring the (user plane) optical signal, carries the segment optical switching identifier information.

According to a further preferred embodiment of the present invention, the segment destination optical node comprises an optical switching element and, as part of the probe optical branch, a processing and/or control element, wherein the optical switching element comprises an (optical) input port as well as the first (optical) output port and the second (optical) output port, wherein the optical switching element is able to be controlled, especially via using a control input port and a control command, to transmit or to forward an optical signal that is fed to or incoming at the (optical) input port either towards the first (optical) output port or towards the second (optical) output port, wherein selecting either the first output port or the second output port is caused by the processing and/or control element controlling the optical switching element.

It is thereby advantageously possible according to the present invention that the processing and/or control element controls the behavior of and/or is able to modify the configuration of the optical switching element in order to influence and/or to modify which optical signal (of potentially a plurality of input optical signals) is forwarded to which output port (of the at least two output ports but preferably more than two output ports) of the optical switching element (and thereby also of the segment destination optical node.

Especially, the processing and/or control element is linked or connected to the control input port of the optical switching element, and especially generates a signal or the control command, especially an electrical signal or command, for controlling the optical switching element and/or for modifying the configuration of the optical switching element.

Furthermore, it is advantageously possible and preferred according to the present invention that the segment destination optical node comprises, as part of the probe optical branch, a splitter element, wherein, via the splitter element, a control signal is separated or branched off from the optical signal, and transmitted to the processing and/or control element, wherein the control signal is processed by the processing and/or control element such as to detect or to determine the segment optical switching identifier information, wherein especially a control command is transmitted, by the processing and/or control element, to the optical switching element in order to configure the optical switching element, wherein especially the branched-off (optical) control signal is converted, by the splitter element, into an electrical signal and provided or sent to the processing and/or control element, or wherein the branched-off (optical) control signal is provided to the processing and/or control element and converted there into an electrical signal.

Via the splitter element, the (optical) control signal is separated or branched off from the (user plane) optical signal, and transmitted to the processing and/or control element. The processing and/or control element processes and/or analyses the (optical) control signal such as to detect or to determine the segment optical switching identifier information, and, subsequently, generate the (typically electrical) control command to be transmitted to the optical switching element.

The segment optical switching identifier information especially corresponds to an information indicating an optical route or path through the network of optical nodes, i.e. the segment optical switching identifier information does not necessarily comprise the switching or configuration indication or control command to be transmitted to the optical switching element: according to a preferred variant of the present invention, the processing and/or control element comprises information, such as, e.g., a table or a database wherein a specific control command (to be transmitted to the optical switching element, and corresponding to a specific configuration of the optical switching element or its behavior) is able to be derived from a given piece of segment optical switching identifier information detected or determined by the processing and/or control element.

Furthermore, it is advantageously possible and preferred according to the present invention that the segment destination optical node comprises, as part of the probe optical branch, a coupler element, wherein the processing and/or control element generates a further control signal, wherein via the coupler element the further control signal is added to the optical signal in a manner such that the further control signal is added to the optical signal at its respective output port of the optical switching element wherein especially the further control signal comprises a further segment optical switching identifier information, especially being identical or being different from the segment optical switching identifier information, wherein the further control signal comprises information for the next segment destination optical node as a switching instruction for this next node, wherein especially the further control signal is or corresponds to an electrical signal and wherein the coupler element is or corresponds to a modulator being controlled by the further control signal.

It is thereby advantageously possible, according to the present invention to optionally also modify the control signal received by the next segment destination optical node (and thereby also to modify (or amend) the segment optical switching identifier information received, detected and/or determined by the next segment destination optical node). This is the case as, typically, the (user plane) optical signal travels (or is transmitted) through a succession of a multitude of optical nodes, wherein the further control signal is added (by the coupler element of a given optical node) to the (user plane) optical signal, and received as the control signal (branched-off from the (user plane) optical signal) by the subsequent optical node.

Furthermore, it is advantageously possible and preferred according to the present invention that the control signal and/or the further control signal correspond to a signal that is modulated on or to the (user plane) optical signal, especially by amplitude modulation or phase modulation,

- wherein especially the control signal and/or the further control signals correspond to—compared to the frequency of the (user plane) optical signal—a low frequency signal, especially having frequencies in the range of frequencies of or superior to a lower limit and frequencies of or inferior to an upper limit, wherein the lower limit corresponds to one out of the following: 10 Hz, 30 Hz, 100 Hz, 300 Hz or 1000 Hz, and wherein the upper limit corresponds to one out of the following: 10 kHz, 30 kHz, 100 kHz, 300 kHz, 1 MHz, 3 MHz, 10 MHz, 30 MHz, 100 MHz, 300 MHz.

It is thereby advantageously possible to easily and effectively implement a method according to embodiments of the present invention.

Furthermore, it is advantageously possible and preferred according to the present invention that the optical transmission path of the optical signal comprises a plurality of transmission segments between a respective segment source optical node and a respective segment destination optical node, wherein, regarding consecutive transmission segments along the optical transmission path of the optical signal, the segment destination optical node of the preceding transmission segment corresponds to the segment source optical node of the subsequent transmission segment, wherein especially the optical transmission path of the optical signal starts at a global source optical node and ends at a global destination optical node, wherein a plurality of transmission segments exist between the global source optical node and the global destination optical node.

It is thereby advantageously possible to easily and effectively provide for an establishment and/or or switching of the optical transmission path in order to transmit the (user plane) optical signal through the telecommunications network (or, at least, the part of the telecommunications network being made up by optical network nodes.

Furthermore, it is advantageously possible and preferred according to the present invention that the segment optical switching identifier information is transported by or together with the optical signal and wherein at least one out of the following holds for the segment optical switching identifier information:

- the segment optical switching identifier information is generated by the global source optical node and the segment optical switching identifier information comprises an identifier or a piece of information defining or referring to the full optical path between the global source optical node and the global destination optical node, especially defining or referring to all intermediate optical switching nodes that need to be passed by the optical signal, and especially relating to a deterministic and preconfigured route or path through the optical network between the global source optical node and the global destination optical node,
- the segment optical switching identifier information is able to be modified and/or enriched, by a local node controller, via additional information, especially in order to change a preconfigured route or path that is defined by the global source optical node, especially for a local bypass or detour within the network, especially for reasons such as network path protection or network path restoration in case of a local network failure,
- the segment optical switching identifier information comprises, instead of a global path information, an information or indication regarding or indicating the global destination optical node, and, in addition thereto, an information regarding or indicating the next segment destination optical node of the path to be switched through the network, while this next segment destination optical node especially modifies or extends the segment optical switching identifier information by an information regarding or indicating the subsequent segment destination optical node, wherein especially the optical signal thereby steering itself through the network between the global source optical node and the global destination optical node.

It is thereby advantageously possible to easily and effectively implement a method according to embodiments of the present invention.

It is furthermore especially preferred according to the present invention that the telecommunications network comprises a path computation entity or functionality as part of or connected to or associated with a network orchestrator entity or functionality, wherein the path computation entity or functionality especially calculates the user plane optical route, especially taking into account shared risk groups, lambda blocking constraints and/or the topology of the telecommunications network, and wherein, in the segment optical switching identifier information, these constraints are taken into consideration, either on a global level (i.e. between the global source and destination optical nodes) or on a local level (i.e. between the segment source and destination optical nodes). Hence, it is advantageously possible, according to the present invention, to provide for an establishment or realization of the network-internal transmission functionality or transmission path among the plurality of optical network nodes via using centrally defined pieces of transmission path information (reflected or referred to via the segment optical switching identifier information) in combination with source-initiated optical routing or switching via using optical segment switching.

The segment optical switching identifier information—especially provided as a modulation of the (user plane) optical signal—that is received at a considered optical network node, especially comprises a switching information or switching indication or a reference or indication related to or referring to the transmission path such that the respective (or considered) optical network node is able to apply (via a communication between the processing and/or control element and the optical switching element) the corresponding switching decision (e.g. select the first consecutive optical network node instead of a second consecutive optical network node). Thereby, it is advantageously possible according to the present invention that the user plane optical route is established or defined, at least partly, via communication between consecutive optical nodes of the telecommunications network, especially of the backbone network and/or the aggregation network of the telecommunications network.

According to the present invention, the (user plane) optical signal especially corresponds to a signal that is essentially unchanged between the global source optical node and the global destination optical node, hence, the telecommunications network and its infrastructure is able to be used to transmit the (user plane) optical signal more or less transparently and essentially without being modified between the global source network node and the global destination network node: in addition, the telecommunications network is preferably also able to be used to provide end-user communication services and/or IP connectivity to end-users, especially via connecting such end-users via central office points of delivery to the optical network nodes.

Furthermore, the present invention relates to an optical network node for establishing or switching an optical transmission path in order to transmit an optical signal, the optical network nodes being part of a telecommunications network comprising a plurality of optical network nodes and corresponding, along the transmission path of the optical signal, to a segment destination optical node receiving the optical signal from a segment source optical node,

- wherein, regarding the establishment or switching of the optical transmission path, a segment optical switching identifier information is received by the segment destination optical node,
- wherein the segment optical switching identifier information is received together with the optical signal using its spectral transmission width,
- wherein the segment destination optical node comprises a probe optical branch and at least a first output port and a second output port,
- wherein, in order to establish or to switch the optical transmission path through the optical network nodes of the telecommunications network, the optical network node is configured such that:
  - the segment optical switching identifier information is detected and determined by the segment destination optical node and
  - the segment destination optical node is controlled such that—depending on the determined content of the segment optical switching identifier information—either the first output port or the second output port is selected regarding establishing or switching the optical transmission path.

Furthermore, it is preferred, especially with respect to the optical network node, that the segment destination optical node comprises an optical switching element and, as part of the probe optical branch, a processing and/or control element, wherein the optical switching element comprises an input port as well as the first output port and the second output port,

- wherein the optical switching element is configured to be controlled to transmit or to forward an optical signal that is fed to or incoming at the input port either towards the first output port or towards the second output port,
- wherein the segment destination optical node is configured such that the selection of either the first output port or the second output port is caused by the processing and/or control element controlling the optical switching element.

Furthermore, it is preferred, especially with respect to the optical network node, that the segment destination optical node comprises, as part of the probe optical branch, a splitter element,

- wherein the segment destination optical node is configured such that, via the splitter element, a control signal is separated or branched off from the optical signal, and transmitted to the processing and/or control element, wherein the segment destination optical node is furthermore configured such that the control signal is processed by the processing and/or control element such as to detect or to determine the segment optical switching identifier information,
- wherein especially the segment destination optical node is furthermore configured such that a control command is transmitted, by the processing and/or control element, to the optical switching element in order to configure the optical switching element,
- wherein especially the segment destination optical node comprises, as part of the probe optical branch, a coupler element,
- wherein the segment destination optical node is configured such that the processing and/or control element generates a further control signal,
- wherein the segment destination optical node is furthermore configured such that, via the coupler element, the further control signal is added to the optical signal in a manner such that the further control signal is added to the optical signal at its respective output port of the optical switching element
- wherein especially the segment destination optical node is furthermore configured such that the further control signal comprises a further segment optical switching identifier information, especially being identical or being different from the segment optical switching identifier information.

Additionally, the present invention relates to a backbone network, aggregation network or telecommunications network for establishing or switching an optical transmission path in order to transmit an optical signal, the backbone network, aggregation network or telecommunications network comprising a plurality of optical network nodes according to the present invention.

Furthermore, the present invention relates to a system for establishing or switching an optical transmission path in order to transmit an optical signal comprising a plurality of optical network nodes according to the present invention.

Still additionally, the present invention relates to a program comprising a computer readable program code which, when executed on a computer and/or on a network node of a telecommunications network, causes the computer and/or the network node of the telecommunications network to perform a method according to embodiments of the present invention.

Furthermore, the present invention relates to a computer-readable medium comprising instructions which when executed on a computer and/or on a network node of a telecommunications network, causes the computer and/or the network node of the telecommunications network to perform a method according to embodiments of the present invention.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. “a”, “an”, “the”, this includes a plural of that noun unless something else is specifically stated.

Furthermore, the terms first, second, third and the like in the description and in the claims are used for distinguishing between similar elements and not necessarily for describing a sequential or chronological order: this is especially the case for the terms “first step”, “second step”, etc. It is to be understood that the terms so used are interchangeable under appropriate circumstances and that the embodiments of the invention described herein are capable of operation in other sequences than described or illustrated herein.

Figure 2:
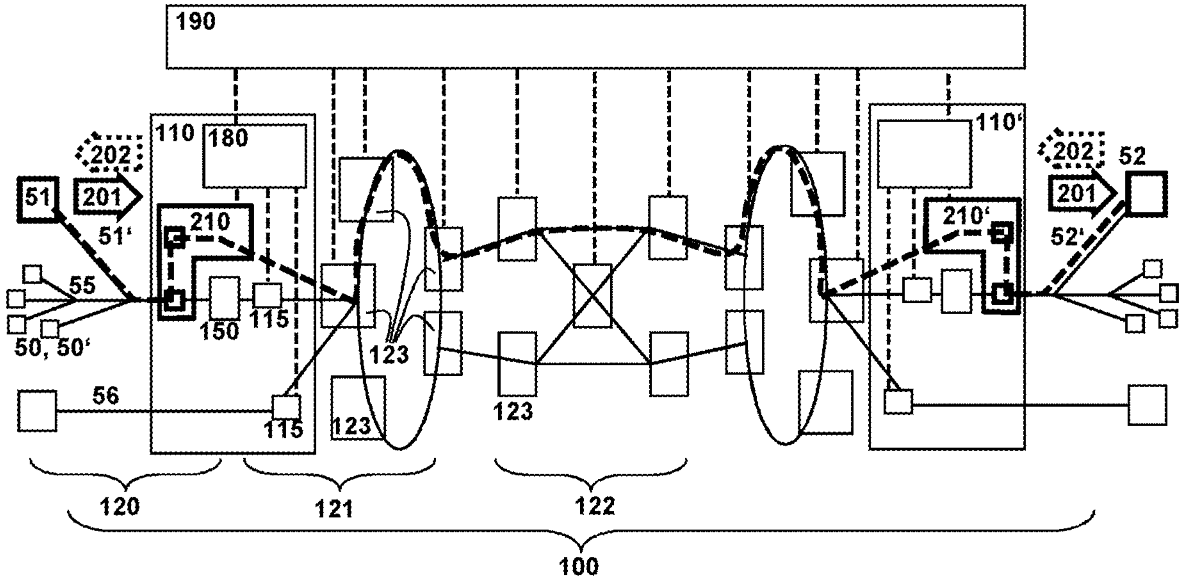
FIG. 2 schematically shows the telecommunications network providing a communication or connectivity service between a first location and a second location based on optical data transmission of a user-defined optical signal, the telecommunications network comprising a backbone network and/or an aggregation network as well as the access network.

In FIG. 2, a telecommunications network 100 according to the present invention is schematically shown. The telecommunications network 100 comprises, especially as part of a backbone network 122 and/or as part of an aggregation network 121 a plurality of optical network nodes 123 or optical nodes 123. Preferably, user equipments or client devices are able to be connected to the telecommunications network 100 via a (broadband) access network 120 (as part of the telecommunications network 100 or associated or assigned to it), the broadband access network 120 especially comprising, at least one logical or physical central office point of delivery 110 that is preferably realized within a (mini) data center and that is especially handling different access requirements, especially different access possibilities, of the client devices to network functionalities provided by the telecommunications network 100 or via the telecommunications network 100. The client devices are typically connected to the logical or physical central office point of delivery 110 via a customer premises equipment device 50, 50' or via a customer premises equipment functionality that might be built into or realized by the client devices.

FIG. 2 schematically shows the telecommunications network 100 providing a communication or connectivity service between a first location 51 and a second location 52 based on optical data transmission of a user-defined (and/or user plane) optical signal 201 through the backbone network 122 and/or the aggregation network 121 as well as the access network 120 along a path that the (user plane) optical signal 201 takes from the first location 51 to the second location 52 through the telecommunications network 100; this path is schematically indicated via a bold dashed line in FIG. 2. Furthermore, the telecommunications network 100 comprises a network orchestrator 190. The first location 51 is especially linked to the telecommunications network 100 via at least one first optical data transmission fiber 51', and the second location 52 is linked to the telecommunications network 100 via at least one second optical data transmission fiber 52'. In FIG. 2, the case is schematically shown that also a further optical signal 202 (travelling, or being transmitted, in opposing direction compared to the optical signal 201) takes the same path as schematically shown for the optical signal 201. However, this is not always mandatorily realized: Both the backbone network 122 and also aggregation networks 121 are schematically shown as comprising a plurality of optical network nodes 123, and, typically, there are different paths through the telecommunications network 100 or its infrastructure that are possible between any of the optical nodes, and the further optical signal 202 might well travel (or be transmitted) using a different path from the path of the user-defined optical signal 201.

Furthermore according to the present invention, the broadband access network 120 comprises an optical safety and policy entity or functionality 210 connecting the first location 51 and/or the first optical data transmission fiber 51' to the telecommunications network 100, especially to its aggregation network 121 and/or its backbone network 122, wherein the optical safety and policy entity or functionality 210 especially provides for protection of the optical transmission functionality (especially with regard to the backbone network 122 and/or the aggregation network 121), for a policy decision functionality, and for a policy enforcement functionality regarding the user-defined optical signal 201. Likewise, typically, the broadband access network 120 comprises a further optical safety and policy entity or functionality 210' connecting the second location 52 and/or the second optical data transmission fiber 52' to the telecommunications network 100, especially to its aggregation network 121 and/or its backbone network 122, wherein the further optical safety and policy entity or functionality 210' provides for protection of the optical transmission functionality (especially with regard to the backbone network 122 and/or the aggregation network 121), for a policy decision functionality, and for a policy enforcement functionality regarding the further user-defined optical signal 202.

In the exemplary embodiment shown in FIG. 2, the optical safety and policy entity or functionality 210 is co-located with the at least one central office point of delivery 110, and especially the central office point of delivery 110 comprises or is coupled with the optical safety and policy entity or functionality 210. Likewise in the exemplary embodiment shown in FIG. 2, the further optical safety and policy entity or functionality 210' is co-located with a further central office point of delivery 110', and especially the further central office point of delivery 110' comprises or is coupled with the further optical safety and policy entity or functionality 210'. However, this symmetrical architecture (regarding the connection of the first and the second location 51, 52 to the telecommunications network 100) is only exemplarily shown in FIG. 2, and the first location 51 is able to be linked to the telecommunications network 100 in a different manner compared to the second location 52. As part of the central office point of delivery 110, an access node 150 is schematically shown; such access nodes 150 are typically used, as part of their respective central office points of delivery 110, 110', to connect end-users 50, 50' to the access network 120, and thereby to the telecommunications network 100.

Furthermore as part of the central office point of delivery 110, a switching fabric 115 (or, rather two instances of a switching fabric) is schematically shown in FIG. 2. In FIG. 2, the end-users 50, 50' are schematically shown as connected to the access network 120 via an optical communication link 55, especially a passive optical network, PON. Alternatively to using a passive optical network 55, a point-to-point connection 56, especially an optical point-to-point connection 56, is schematically shown in FIG. 2. Furthermore as part of the central office point of delivery 110, an orchestrator entity or functionality 180 is schematically shown in FIG. 2.

According to the present invention, an optical transmission path is established or switched, through the optical network nodes 123 of the telecommunications network 100 in order to transmit an optical signal 201. The optical signal 201 is a user plane optical signal to be transmitted, or transported, from a global source optical node to a global destination optical node. In the exemplary embodiment or implementation shown in FIG. 2, the optical safety and policy entity or functionality 210 and the further optical safety and policy entity or functionality 210' serve as the global source optical node and the global destination optical node, respectively, and the optical transmission path is to be established or switched using the optical network nodes 123 of the aggregation network and/or the backbone network of the telecommunications network 100.

According to the present invention, the optical transmission path traverses at least two consecutive optical network nodes 123, 123' of a transmission segment shown in FIG. 1. The at least two consecutive optical network nodes 123, 123' comprise at least a segment source optical node 123 and at least a segment destination optical node 123'.

Furthermore according to the present invention, regarding the establishment or switching of the optical transmission path, a segment optical switching identifier information is transmitted, by the segment source optical node 123, and received by the segment destination optical node 123'. The segment optical switching identifier information is transmitted together with the optical signal 201. Each one (or, at least, most) of the optical network nodes 123, and, hence, also the segment destination optical node 123' comprises a probe optical branch. Regarding the segment destination optical node 123', the probe optical branch is schematically indicated via reference signs 124', 125', 126'; furthermore the first output port B' and the at least second output port C' are also shown regarding the segment destination optical node 123'.

According to the present invention, in order to establish or to switch the optical transmission path through the optical network nodes 123, 123' of the telecommunications network 100, in a first step, the segment optical switching identifier information is detected and determined by the segment destination optical node 123' and, in a second step, the segment destination optical node 123' is controlled such that—depending on the determined content of the segment optical switching identifier information—either the first output port B' or the second output port C' is selected regarding establishing or switching the optical transmission path. Of course it is possible (and in most cases also realized) that an optical node 123, 123' comprises more than one input port and more than two output ports. However, for the sake of simplicity, only one input port and two output ports are schematically shown in FIG. 1 regarding the segment source optical node 123 and the segment destination optical node 123'.

FIG. 1 shows a plurality of optical network nodes (or optical nodes) 123, 123'. 123". Each of these optical network nodes (or optical nodes) 123, 123', 123" has a corresponding or respective probe optical branch. For the sake of simplicity, the probe optical branch is only represented for a first optical network node 123, and a second optical network node 123', whereas for a third optical network node 123" no such probe optical branch is represented in FIG. 4 (but is actually present). Regarding the optical transmission segment of the first optical node 123 and the second optical node 123', the first optical node 123 corresponds to the segment source optical node 123, and the second optical node 123' corresponds to the segment destination optical node 123'.

The segment source optical node 123 comprises an optical switching element 127, and the segment destination optical node 123' comprises a further optical switching element 127'. The optical switching element 127 and the further optical switching element 127' is/are or correspond(s) to a conventionally known optical switching element that is able to switch (or to transmit or to forward) an incoming optical signal either to a first output port or to at least second output port.

Regarding the optical switching element 127, the optical signal is input at a point A (input port of the optical switching element 127) as schematically shown in FIG. 1—either to a point B (also called an optical output port B) or to a point C (also called an optical output port C). Hence, depending on the respective configuration of the optical switching element 127, the optical (input) signal, arriving (or being fed to the optical switching element 127) at the optical input port A, is either forwarded or output at the optical output port B or at the optical output port C. In the exemplary embodiment (or part of the telecommunications network 100) shown in FIG. 1, the second optical network node 123' is connected to the optical output port B of the first optical network node 123, and the third optical network node 123" is connected to the optical output port C of the first optical network node 123; hence, depending on the respective configuration of the optical switching element 127, the optical (input) signal, arriving (or being fed to the optical switching element 127) at the optical input port A, is either forwarded or output to the second optical network node 123' (if forwarded to optical output port B) or to the third optical network node 123" (if forwarded to optical output port C).

Likewise regarding the further optical switching element 127', the optical signal is input at a point A' (input port of the further optical switching element 127') as schematically shown in FIG. 1—either to a point B' (also called an optical output port B) or to a point C' (also called an optical output port C'). Hence, depending on the respective configuration of the further optical switching element 127', the optical (input) signal, arriving (or being fed to the optical switching element 127) at the optical input port A', is either forwarded or output at the optical output port B' or at the optical output port C'. In the exemplary embodiment (or part of the telecommunications network 100) shown in FIG. 1, the second optical network node 123' (segment destination optical node 123) is not explicitly shown to be connected other optical nodes, but in reality will be connected to other optical nodes (unless, perhaps, in case it corresponds to the global destination optical node). Both the first optical network node 123 and the second optical node 123' (as well as the further optical nodes) might additionally also comprise further optical output ports (that are, for the sake of simplicity, not shown in FIG. 1) and/or further optical input ports (that are neither shown in FIG. 1). Among the different optical network nodes of the telecommunications network 100 (especially of the backbone network 122 and/or of the aggregation network 121), a different number of input ports and/or output ports might be realized, especially depending on where such nodes are located and how such nodes are connected with other optical network nodes of the telecommunications network 100; however, the basic principle is as represented in FIG. 1. According to the present invention, such optical network nodes 123, 123', 123" comprise—besides an optical switching element (the optical switching element 127 is represented in FIG. 1 with regard to the first optical network node 123, and the further optical switching element 127' is represented in FIG. 1 with regard to the second optical network node 123')—, respectively, a probe optical branch. Regarding the first optical network node 123, the probe optical branch is schematically shown comprising a splitter element 124, a processing and/or control element 125, and an optical coupler element 126, and, regarding the second optical network node 123', the probe optical branch is schematically shown via a further splitter element 124', a further processing and/or control element 125', and a further optical coupler element 126'.

As already mentioned, in the optical segment provided by the first optical network node 123 and the second optical network node 123', the first optical network node 123 corresponds to the segment source optical node 123, whereas the second optical network node 123' corresponds to the segment destination optical node 123'. In order to describe the present invention, in the following the segment destination optical node 123' is explained in more detail: Regarding the segment destination optical network node 123', via the further splitter element 124', a control signal is separated from (or branched off) the user plane (and user-defined) optical signal 201 transmitted towards the segment destination optical (network) node 123' (i.e. at an input port A* of the segment destination optical (network) node 123') the user plane optical signal 201 is received with the control signal; the control signal is split off at the further splitter element 124', and at point A' or input port A' of the further optical switching element 127', the user plane optical signal 201 is fed to the further optical switching element 127' either with the control signal or without the control signal. Regarding the segment destination optical (network) node 123', the branched-off control signal (split off the user plane optical signal 201 at the further splitter element 124') is processed via the further processing and/or control element 125'; the further processing and/or control element 125' is connected to the further optical switching element 127' which is schematically illustrated via an downward facing arrow. This connection between the further processing and/or control element 125' and the further optical switching element 127' especially corresponds to a control connection via which a modification of the configuration of the further optical switching element 127' is possible (i.e. especially regarding towards which output port (B' or C') the incoming optical signal is to be forwarded or switched); further configuration parameters might include the applicable optical amplification and/or the kind of regeneration of the optical signal potentially performed at or by the further optical switching element 127').

According to a first variant of the probe optical branch of the segment destination optical node 123', the probe optical branch only comprises the further splitter element 124', the further processing and/or control element 125' and the control link or control connection of the further processing and/or control element 125' towards the further optical switching element 127.

According to a second variant of this probe optical branch, the probe optical branch additionally comprises—besides the further splitter element 124', the further processing and/or control element 125' and the further control link or control connection of the further processing and/or control element 125' towards the further optical switching element 127'—the further coupler element 126', via which it is possible to add, to the optical user plane signal 201 being output (by the further optical switching element 127) either at its first output port B' or at its second output port C', a further control signal that is transmitted, together with (or as part of) the user plane optical signal 201 to the segment destination node of the next transmission segment (which is not shown in FIG. 1). FIG. 1 shows a further optical coupler element 126' with regard to the first output port B' and, as well, a further optical coupler element 126' (having the same reference sign) with regard to the second output port C'; this is to illustrate that the respective further optical coupler elements 126' are basically configured identically but there might be (and typically are) different further control signals to be coupled to the optical (user-defined) signals that are output at either output ports B' or C' of the further optical switching element 127'.

In FIG. 4, also the first optical network node 123 (i.e. the segment source optical node 123 of the transmission segment considered, which optical node is, typically, itself a segment destination optical with respect to preceding optical transmission segment) is shown to be provided with, or comprise, the (respective) probe optical branch, as well as the optical switching element 127. In a manner analogous to the probe optical branch of the segment destination optical (network) node 123' (i.e. comprising the further splitter element 124', the further processing and/or control element 125', and, if applicable, the further coupler element 126'), also the segment source optical (network) node 123 comprises the splitter element 124, the processing and/or control element 125, and, if applicable, the coupler element 126. Furthermore in a manner analogous to the functionality of the segment destination optical network node 123', also the optical switching element 127 typically comprises a plurality of output ports in order to connect the first optical network node 123 to different subsequent optical network nodes (i.e., according to the exemplary scenario shown in FIG. 1, either to the second optical network node 123' or to the third optical network node 123'). Between the segment source optical node 123 and the segment destination optical node 123' (or between the first and third optical network node 123, 123'), the segment optical switching identifier information is transmitted together with the user plane optical (user-defined) signal 201 along its transmission path: i.e. in the exemplary embodiment shown in FIG. 1, at least from the first optical network node 123 to the second optical network node 123' or from the first optical network node 123 to the third optical network node 123" (depending on the switching configuration of the optical switching element 127 of the first optical network node 123), i.e. the segment optical switching identifier information is transmitted at least between consecutive optical network nodes. According to a further embodiment of the present invention, either the (complete) segment optical switching identifier information or at least a part of the segment optical switching identifier information is transmitted not only between consecutive optical network nodes but along a transmission path of (or provided by) the network-internal transmission functionality, i.e. between a plurality of optical network nodes 123, 123', 123" and along the considered transmission path of the user plane optical signal 201.

Especially according to the present invention, the segment optical switching identifier information is provided as a modulation of the user plane optical signal 201. Via the respective probe optical branch (and especially the corresponding splitter elements 124, 124', the corresponding processing and/or control elements 125, 125', and, if applicable, the corresponding coupler elements 126, 126'), each one of the optical network nodes 123, 123', 123" that is receiving a user plane optical signal (i.e. each segment destination optical node) is able to receive and process the modulation signal (i.e. the corresponding control signal) and to read or detect the respective segment optical switching identifier information. The specific (or respective) segment optical switching identifier information, received at a respective (or considered) optical network node, especially comprises a switching information or switching indication or a reference or indication related to or referring to a transmission path such that the respective (or considered) optical network node 123, 123', 123" is able to apply a switching decision (e.g. select a first consecutive optical network node (corresponding, in the scenario shown in FIG. 1 and regarding the first optical network node 123, to the second optical network node 123'), instead of a second consecutive optical network node (corresponding, in the scenario shown in FIG. 1 and regarding the first optical network node 123, to the third optical network node 123")).

According to the present invention, the respective control signals (branched off, e.g., at the splitter elements 124, 124') and/or (if applicable) the respective further control signals (coupled or added to, e.g., at the coupler elements 126, 126') especially correspond to—compared to the frequency of the optical signals—low frequency signals (having frequencies, e.g., in the range between a couple of 10 Hz to a couple of 10 kHz or 10 MHz or up to a couple of 100 kHz or 100 MHz).

According to the present invention, it is advantageously possible to provide and end-to-end production between the global source optical node and the global destination optical node via using software defined network-based traffic steering being conducted by self steering or optical source switching (full peer-to-peer POD source steering & core node self "routing"), using a path computation element, PCE, and a database (especially as part of the orchestrator or software defined network control 190), wherein the information exchange to or from the path computation element may be in-band or independent intra/zero-trust internet routing. This is explained in the following, however the term "POD" refers to the respective central office point of delivery 110 or to the respective optical safety and policy entity or functionality 210:

In a first processing step, the customer connects itself via own lambda beam with or without signal (free irradiation, not limited or controlled by the network operator).

In a second processing step, the policy decision function (PDF, part of local POD gatekeeper) of Source POD checks first sign of life and decodes the service request (by dialogue with overall platform management, i.e. OSS/BSS: this can be done via an umbrella orchestrator or any other systems that manage network and services).

In a third processing step, a network safety enforcement function (NSEF, part of local POD gatekeeper) of source POD blocks lambda without service approval or dangerous spectral or power-related properties: physical safety for network and network operation (service operation) by fast optical transmission shut-down is ensured by the NSEF. In case of no safety constraints, the PEF (policy enforcement function) takes over at the seventh processing step.

In a fourth processing step, the destination POD is identified via source-POD data-base request.

In a fifth processing step, the route request (working path or more than one resilient paths 1 or N) is triggered by the source POD, requesting it from the PCE entity (coupled with data base that contains information on network topology/infrastructure, node-link-SRG, lambda depletion situation):

- the PCE calculates the (non-protected) path or SRG-related (shared risk group-related) protection schemes (e.g. shortest-circle or 1+N protection or pre-calculated restoration);
- the PCE takes into account lambda blocking constraints, based on network topology, lambda map and lambda depletion situation:
- the PCE calculates best routes with respect to pre-configured optimization metrics, e.g. shortest source-POD-to-destination-POD route for lowest available latency;
- the PCE updates the information tables of the data base with the new lambda depletion situation.

In a sixth processing step, the source POD now modulates an optical ID on top of the customer wavelength spectrum. This is a "segment optical switching ID" (SOSID) that is read out by any optical switch in the transit path between optical switches (e.g. wavelength-selective switches (WSS) or typically reconfigurable optical add-drop-multiplexers (ROADM)); these optical switches/ROADMs need an optical coupler (fiber based or integrated-optics based) at the input fiber port (optical probe), and an ID modulation detector at the end of this probe optical branch (photodiode/detector with electronic decoder chip). The SOSID gives a local switching command to the local ROADM in the transit core network. The optical switch (ROADM) configures and switches the light path autonomously based on the SOSID information (the local MP/CP/EMS entity of the switch). The spectrum (gridless ROADM) will be adjusted based on the SOSID information. So, the SOSID must contain next neighbor port (result from the PCE calculation) for switching the direction (mandatory) and can contain spectral window information (optional) if a free spectrum service is supported. In that case spectrum overlap avoidance and spectrum blocking will be verified by the local switch or this check is not needed because the CPE has considered it already for the path calculation (spectrum blocking included).

Especially, the following service models are possible:

- standard fixed lambda grid mode (e.g. fixed 50 GHz ITU grid for all channels and bandwidth/reach is defined only by the applied modulation format and customer transceiver capabilities:
- flexible spectrum window mode (here the spectrum can be defined more flexible, the PCE calculates optimum path and spectrum collision free E2E routes: gap bands due to difficult fit may occur, they may (e.g.) be charged to the customer's service);
- hybrid band operational mode at the same fiber: variable spectrum slot (with blocking inefficiencies but flexibility or extra extreme-bandwidth services) and a fixed channel grid spectrum window.

In a seventh processing step, the policy enforcement function (PEF, part of local POD gatekeeper) limits the optical properties with respect to the customer contract and opens the gateway at both E2E PODs (or in case of a PTMP service to all engaged PODs). The POD gateway also modulates the SOSID on top of the optical signal, thus the optical customer signal routes itself through the optical network and unlocks its own path autonomously via the SOSID information.

The optical properties like center wavelength, bandwidth, maximum transit power through the POD and even further optical signal parameters can be detected by the PDF and limited/controlled during service provisioning and during service production until the service is terminated by the NSEF and the PEF. Also, in-situ billing of the customer as well as in-situ reporting of the available and performed SLA can be derived from the data that are gained from that control process.

In an eighth processing step, protection switching or restoration is possible to be enabled:

- regarding the control plane: The control plane that combines the end-point PODs (two for PTP services, more than two for PTMP services) runs on the same optical network but typically uses a higher protocol layer of the network provider's multi-layer transport network. So, it can use standard connectivity services, e.g. via IP: so, the CP connection routes and re-routes (in case of a failure) itself via IP or is re-routed by other standard NW protocols depending on the used standard connectivity service.

regarding the user plane: The user plane, i.e. the optical lambda or spectrum service also can switch (or reroute) itself:

There, especially the local self re-routing scheme TI-LFA is applied. Similar optical self re-routing (or switching) can be applied by autonomous switching of the optical switches (typically ROADMs) by combining the information these optical switching nodes can read from the modulated SOSID and the information on interrupted (by failure) network links or nodes and local connectivity map (stored in the local MP/CP/EMS entity of the switch). The re-routing calculation may follow known algorithms such as TI-LFA or alternative schemes. The optical switches may have the ability to modulate extra signals (i.e. control signals, cf. FIG. 1) onto the optical signal, so that re-routing information or network information or node (optical switch) information can be modulated enriching the SOSID by extra information for the next optical network nodes or the receiving POD.

By such an application, even a MP/CP north bound connection between the switching nodes and an overarching SDN control or orchestration 190 is able to be omitted; then even the transit core network nodes are able to be controlled by a peer-to-peer control plane (only horizonal steering without central north bound control).

The SOSID modulation typically is a narrow band optical modulation superimposed on the customer broadband modulation of the optical lambda channel This narrow band modulation does not disturb the customer signal and is not detected at the customer receiver as being a much lower analogue signal modulation. The different additional information channels can be modulated at other low frequencies, so that the different information from SOSID by the Source POD and from the optical transit nodes of the core transport network can be separated and interpreted.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for establishing or switching an optical transmission path to transmit an optical signal, wherein a telecommunications network comprises a plurality of optical network nodes, and wherein the optical transmission path traverses at least two consecutive optical network nodes of a transmission segment, the at least two consecutive optical network nodes comprising at least a segment source optical node and at least a segment destination optical node, wherein the segment destination optical node comprises a probe optical branch and at least a first output port and at least a second output port, wherein the method comprises:

receiving, by the segment destination optical node, segment optical switching identifier information together with the optical signal, wherein the optical signal is physically linked with the segment optical switching identifier information based on:

modulation of the optical signal using a spectral transmission width corresponding to the optical signal; or an optical sideband signal using a spectral fraction of the spectral transmission width corresponding to the optical signal; and controlling the segment destination optical node to select, based on content of the segment optical switching identifier information, the first output port or the second output port for establishing or switching the optical transmission path.

2. The method according to claim 1, wherein the segment destination optical node comprises an optical switching element and, as part of the probe optical branch, a processing and/or control element, wherein the optical switching element comprises an input port as well as the first output port and the second output port;

wherein the optical switching element is configured to be controlled to transmit or to forward the optical signal from the input port either towards the first output port or towards the second output port; and wherein selecting the first output port or the second output port is caused by the processing and/or control element controlling the optical switching element.

3. The method according to claim 2, wherein the segment destination optical node comprises, as part of the probe optical branch, a splitter element;

wherein, via the splitter element, a control signal is separated or branched off from the optical signal, and transmitted to the processing and/or control element, wherein the control signal is processed by the processing and/or control element;

wherein a control command is transmitted, by the processing and/or control element, to the optical switching element to configure the optical switching element.

4. The method according to claim 3, wherein the segment destination optical node comprises, as part of the probe optical branch, a coupler element;

wherein the processing and/or control element generates a further control signal;

wherein via the coupler element the further control signal is added to the optical signal at a respective output port of the optical switching element;

wherein the further control signal comprises further segment optical switching identifier information;

wherein the further control signal comprises information for a next segment destination optical node as a switching instruction for the next segment destination optical node;

wherein the coupler element is or corresponds to a modulator controlled by the further control signal.

5. The method according to claim 4, wherein the control signal and/or the further control signal correspond to a signal that is modulated on or to the optical signal via amplitude modulation or phase modulation;

wherein the control signal and/or the further control signal correspond to have frequency(ies) lower than a frequency of the optical signal.

6. The method according to claim 1, wherein the optical transmission path of the optical signal starts at a global source optical node and ends at a global destination optical node, wherein a plurality of transmission segments exist between the global source optical node and the global destination optical node;

wherein, regarding consecutive transmission segments along the optical transmission path of the optical signal, a respective segment destination optical node of a respective preceding transmission segment corresponds to a respective segment source optical node of a respective subsequent transmission segment.

7. The method according to claim 6, wherein:

the segment optical switching identifier information is generated by the global source optical node, and the segment optical switching identifier information comprises an identifier or a piece of information defining or referring to the full optical path between the global source optical node and the global destination optical node, defining or referring to all intermediate optical switching nodes that need to be passed by the optical signal, and relating to a deterministic and preconfigured route or path between the global source optical node and the global destination optical node;

the segment optical switching identifier information is able to be modified and/or enriched, by a local node controller, via additional information, to change a preconfigured route or path that is defined by the global source optical node, for a local bypass or detour; or the segment optical switching identifier information comprises information or an indication regarding or indicating the global destination optical node, and, in addition thereto, information regarding or indicating the next segment destination optical node, wherein the next segment destination optical node modifies or extends the segment optical switching identifier information by information regarding or indicating a subsequent segment destination optical node.

8. A system for establishing or switching an optical transmission path to transmit an optical signal, wherein the system is part of a telecommunications network comprising a plurality of optical network nodes, wherein the system comprises:

a segment source optical node; and a segment destination optical node comprising a probe optical branch, a first output port, and a second output port;

wherein the segment source optical node is configured to transmit segment optical switching identifier information together with the optical signal to the segment destination optical node, wherein the optical signal is physically linked with the segment optical switching identifier information based on:

modulation of the optical signal using a spectral transmission width corresponding to the optical signal; or an optical sideband signal using a spectral fraction of the spectral transmission width corresponding to the optical signal; and wherein the segment destination optical node is configured to be controlled to select, based on content of the segment optical switching identifier information, the first output port or the second output port for establishing or switching the optical transmission path.

9. The system according to claim 8, wherein the segment destination optical node comprises an optical switching element and, as part of the probe optical branch, a processing and/or control element, wherein the optical switching element comprises an input port as well as the first output port and the second output port;

wherein the optical switching element is configured to be controlled to transmit or to forward the optical signal from the input port either towards the first output port or towards the second output port;

wherein the segment destination optical node is configured such that the selection of either the first output port or the second output port is caused by the processing and/or control element controlling the optical switching element.

10. The system according to claim 9, wherein the segment destination optical node comprises, as part of the probe optical branch, a splitter element;

wherein the segment destination optical node is configured such that, via the splitter element, a control signal is separated or branched off from the optical signal, and transmitted to the processing and/or control element, wherein the segment destination optical node is furthermore configured such that the control signal is processed by the processing and/or control element;

wherein the segment destination optical node is furthermore configured such that a control command is transmitted, by the processing and/or control element, to the optical switching element to configure the optical switching element;

wherein the segment destination optical node comprises, as part of the probe optical branch, a coupler element;

wherein the segment destination optical node is configured such that the processing and/or control element generates a further control signal;

wherein the segment destination optical node is furthermore configured such that, via the coupler element, the further control signal is added to the optical signal at a respective output port of the optical switching element;

wherein the segment destination optical node is furthermore configured such that the further control signal comprises further segment optical switching identifier information.

11. One or more non-transitory computer-readable mediums having processor-executable instructions stored thereon for establishing or switching an optical transmission path to transmit an optical signal, wherein a telecommunications network comprises a plurality of optical network nodes, and wherein the optical transmission path traverses at least two consecutive optical network nodes of a transmission segment, the at least two consecutive optical network nodes comprising at least a segment source optical node and at least a segment destination optical node, wherein the segment destination optical node comprises a probe optical branch and at least a first output port and at least a second output port, wherein the processor-executable instructions, when executed, facilitate performance of the following:

receiving, by the segment destination optical node, segment optical switching identifier information together with the optical signal, wherein the optical signal is physically linked with the segment optical switching identifier information based on:

modulation of the optical signal using a spectral transmission width corresponding to the optical signal; or an optical sideband signal using a spectral fraction of the spectral transmission width corresponding to the optical signal; and controlling the segment destination optical node to select, based on content of the segment optical switching identifier, the first output port or the second output port for establishing or switching the optical transmission path.

12. The method according to claim 1, wherein the optical signal is physically linked with the segment optical switching identifier information based on modulation of the optical signal using the spectral transmission width corresponding to the optical signal.

13. The method according to claim 1, wherein the optical signal is physically linked with the segment optical switching identifier information based on the optical sideband signal using the spectral fraction of the spectral transmission width corresponding to the optical signal.

* * * * *